(12) United States Patent
Rietschin

(10) Patent No.: US 10,725,908 B2
(45) Date of Patent: Jul. 28, 2020

(54) FAST INITIALIZATION OF COMPLEX IN-MEMORY DATA STRUCTURES

(71) Applicant: MICROSOFT TECHNOLOGY LICENSING, LLC, Redmond, WA (US)

(72) Inventor: Axel Rietschin, Sammamish, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 160 days.

(21) Appl. No.: 16/100,715

(22) Filed: Aug. 10, 2018

(65) Prior Publication Data

US 2020/0050542 A1 Feb. 13, 2020

(51) Int. Cl.
*G06F 12/06* (2006.01)
*G06F 9/50* (2006.01)
*G06F 11/14* (2006.01)
*G06F 12/02* (2006.01)
(Continued)

(52) U.S. Cl.
CPC ........ *G06F 12/0646* (2013.01); *G06F 9/5016* (2013.01); *G06F 11/1441* (2013.01); *G06F 12/0246* (2013.01); *G06F 12/1009* (2013.01); *G06F 12/109* (2013.01)

(58) Field of Classification Search
CPC .............. G06F 12/0646; G06F 12/109; G06F 12/1009; G06F 12/0246; G06F 11/1441; G06F 9/5016; G06F 12/023; G06F 9/44557; G06F 9/44521
See application file for complete search history.

(56) References Cited

U.S. PATENT DOCUMENTS 5,794,256 A * 8/1998 Bennett ............... G06F 12/0253
6,499,094 B1  12/2002 Fraser et al.
6,941,410 B1   9/2005 Traversat et al.
(Continued)

FOREIGN PATENT DOCUMENTS

EP    3136253 A1   3/2017
WO 2012175495 A1  12/2012

OTHER PUBLICATIONS

"International Search Report and Written Opinion Issued in PCT Application No. PCT/US2019/038793", dated Oct. 7, 2019, 14 Pages.
(Continued)

*Primary Examiner* — Francisco A Grullon
(74) *Attorney, Agent, or Firm* — Workman Nydegger

(57) ABSTRACT

Restoring a state of stored configuration data. A mapping request may be made for a portion of a backing page file to a second portion of address space. The backing page file includes discrete units of configuration data that are stored in a specific relationship to each other as defined by one or more offset values. A first base address for at least one of the discrete units of configuration data defines a first portion of address space having a preferred address space address. One of the discrete units of configuration data may be restored in the second portion of address space. The restoration may comprise aligning a pointer based on a relationship between a second base address of the second portion of process address space and the one or more offset values. A state of the one of the discrete units of configuration data may be restored.

20 Claims, 8 Drawing Sheets

(51) Int. Cl.
*G06F 12/1009* (2016.01)
*G06F 12/109* (2016.01)

(56) References Cited

U.S. PATENT DOCUMENTS

| | | |
|---|---|---|
| 7,058,785 B1 | 6/2006 | Ochotta |
| 7,434,021 B2 | 10/2008 | Chauvel et al. |
| 7,908,454 B2 | 3/2011 | Leung et al. |
| 9,116,809 B2 | 8/2015 | Asaro et al. |
| 9,875,115 B2 | 1/2018 | Russinovich |
| 2007/0088908 A1 | 4/2007 | Chen |
| 2017/0061055 A1* | 3/2017 | Khan ................. G06F 15/7867 |

OTHER PUBLICATIONS

Hwang, et al., "HEAPO: Heap-Based Persistent Object Store", In Journal of ACM Transactions on Storage, vol. 11, No. 1, Article 3, Dec. 2014, 21 Pages.

* cited by examiner

FAST INITIALIZATION OF COMPLEX IN-MEMORY DATA STRUCTURES

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities.

Software components that run on the computer systems often get configured at runtime and store their configuration in in-memory data structures such as linked lists and trees. Sometimes, the configuration data consists in many entries, for example a file-system filter component might be configured to expose a virtual view of the underlying file system, consisting in several thousand or even tens of thousands of entries, as we see in some virtualization scenarios.

It is often the case that a computing system needs to be shut down or be rebooted. In such case, the configuration data may be lost if there is no way to save the configuration data state and to easily recover the saved configuration data state.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At least one embodiment disclosed herein is related to computing systems and methods for restoring a state of stored configuration data of an application component that is be executed on the computing system. A mapping request may be made for a portion of a backing page file to a second portion of address space. The backing page file includes discrete units of configuration data that are stored in a specific relationship to each other as defined by one or more offset values. A first base address for at least one of the discrete units of configuration data defines a first portion of address space having a preferred address space address for the at least one of the discrete units of configuration data. The mapping may occur at the preferred address space address. One of the discrete units of configuration data stored in the backing page file may be restored in the second portion of address space. The restoration may comprise aligning a pointer based on a relationship between a second base address of the second portion of process address space and the one or more offset values. A state of the one of the discrete units of configuration data may be restored. The first and second base addresses are different.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
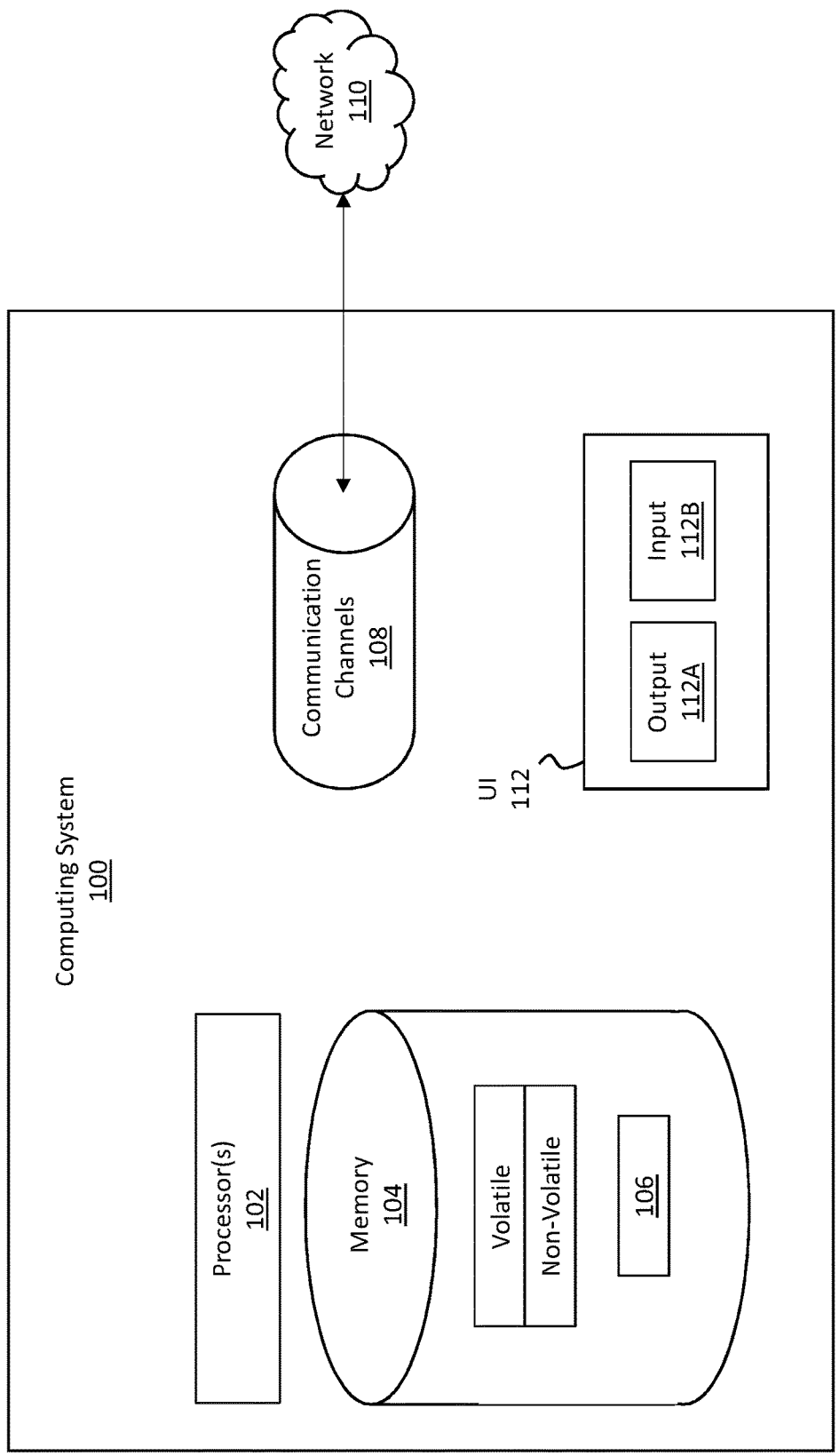
FIG. 1 illustrates an example computing system in which the principles described herein may be employed.

Software components often get configured at runtime and store their configuration in in-memory data structures such as linked lists and trees. Sometimes, the configuration data consists in many entries, for example a file-system filter component might be configured to expose a virtual view of the underlying file system, consisting in several thousand or even tens of thousands of entries, as we see in some virtualization scenarios.

Each entry needs some level of validation before it gets inserted in the internal structures, making it costly in terms of time and computing resources to dynamically configure a very large number of entries. Often, components include a bulk-insert mechanism that makes the configuration process somewhat more efficient, but the configuration time is still heavily dependent on, and proportional to, the number of configuration entries, a exhibiting a O(N) time complexity.

The classic solution to this problem is to make the configuration persistent, that is, to save the state of the component in such a way that it can be restored later, with the premise that the restore operation will be quicker that the re-creation of the structure from scratch. Typical serialization formats include text (flat files, JSON, XML . . . ) or compact binary formats. During the serialization process where the state is saved, the component walks its internal structures and writes the relevant content to a serialization medium, typically a buffer, a stream, or a file, which is then stored for later reuse.

During deserialization, the component typically reads from such a buffer, stream or file, often after some validation of the content, and reconstructs its internal state from the data read from the serialization medium. Typically, nodes from lists and trees are allocated, populated, and inserted in the internal structures, and the component quickly gets back to its operational, configured state.

While typically faster than the recreation of the configured state from scratch, serialization still requires O(n) read/insert operations when reconfiguring, and adds complexity to the component which must include special code to perform the serialization and deserialization of its internal state.

The embodiments disclosed herein provide improvements for restoring configuration data and state over traditional methods of configuration from scratch at runtime or traditional serialization/deserialization methods.

At least one embodiment disclosed herein is related to computing systems and methods for restoring a state of stored configuration data of an application component that is be executed on the computing system. A mapping request may be made for a portion of a backing page file to a second portion of address space. The backing page file includes discrete units of configuration data that are stored in a specific relationship to each other as defined by one or more offset values. A first base address for at least one of the discrete units of configuration data defines a first portion of address space having a preferred address space address for the at least one of the discrete units of configuration data. The mapping may occur at the preferred address space address. One of the discrete units of configuration data stored in the backing page file may be restored in the second portion of address space. The restoration may comprise aligning a pointer based on a relationship between a second base address of the second portion of process address space and the one or more offset values. A state of the one of the discrete units of configuration data may be restored. The first and second base addresses are different.

There are various technical effects and benefits that can be achieved by implementing aspects of the disclosed embodiments. By way of example, at least some of the embodiments disclosed herein are essentially a constant or near constant time operation with an essentially fixed cost regardless of the size or complexity of the configuration data to be restored. This is advantageously an improvement on configuring the configuration data from scratch at runtime, which can take typically take several seconds. It is additionally an improvement on traditional serialization/deserialization where the time to restore the configuration data is in between configuring from scratch and the time of at least some of the embodiments disclosed herein and thus has a larger cost in terms of time and computing resources. Further, the technical effects related to the disclosed embodiments can also include reduced power consumption, and can also include efficiency gains, as the quicker time will require less processing resources, which can in turn be used by other process of the computing system.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein may also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2A:
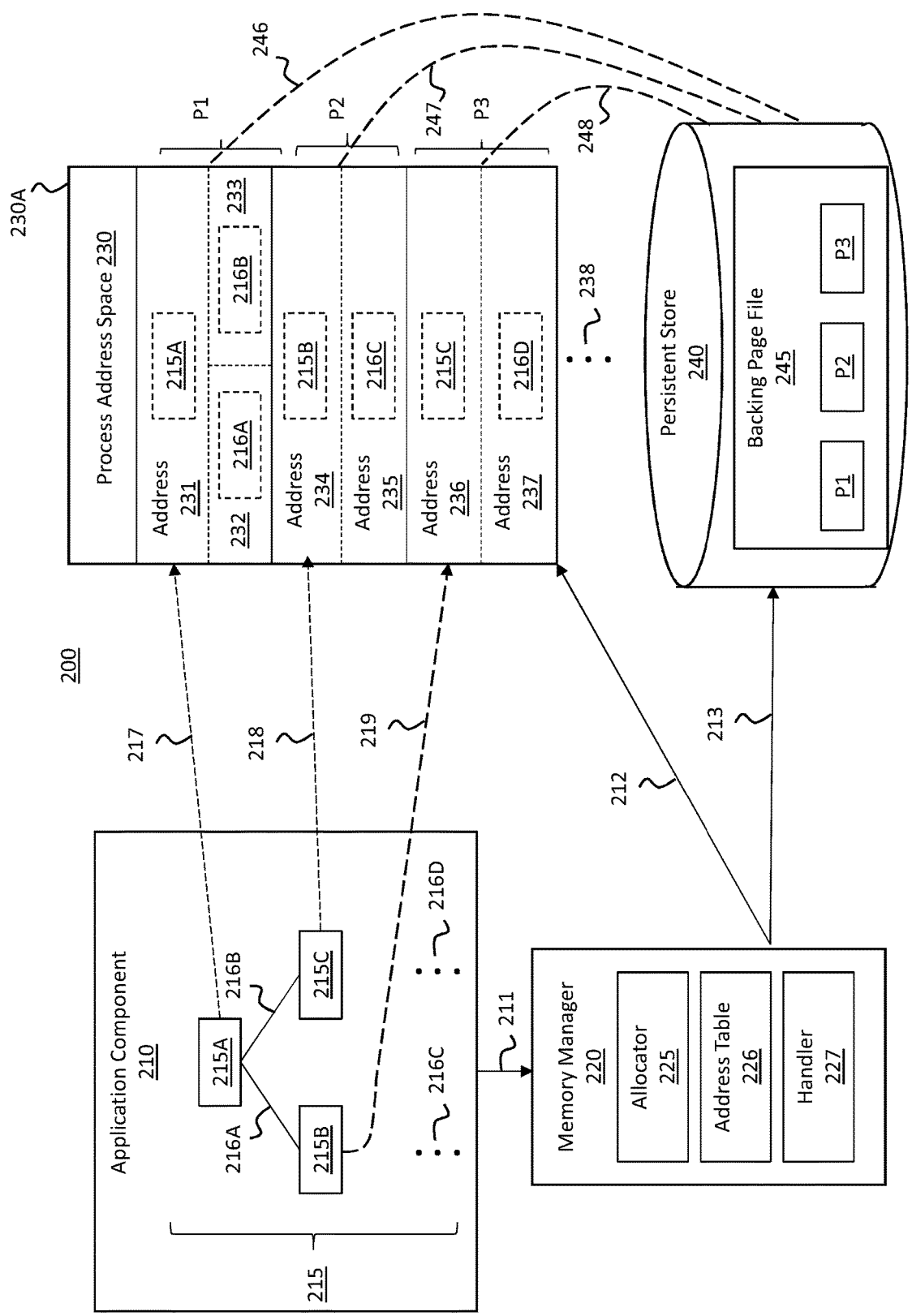
FIGS. 2A-2C illustrates a first embodiment of a computing system that may implement the embodiments disclosed herein.
Figure 2B:
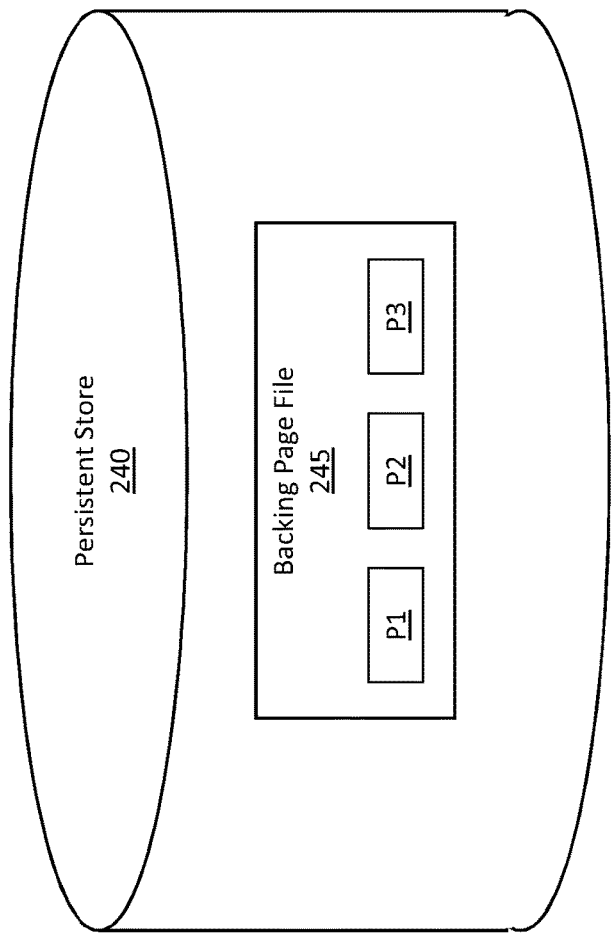
Figure 2C:
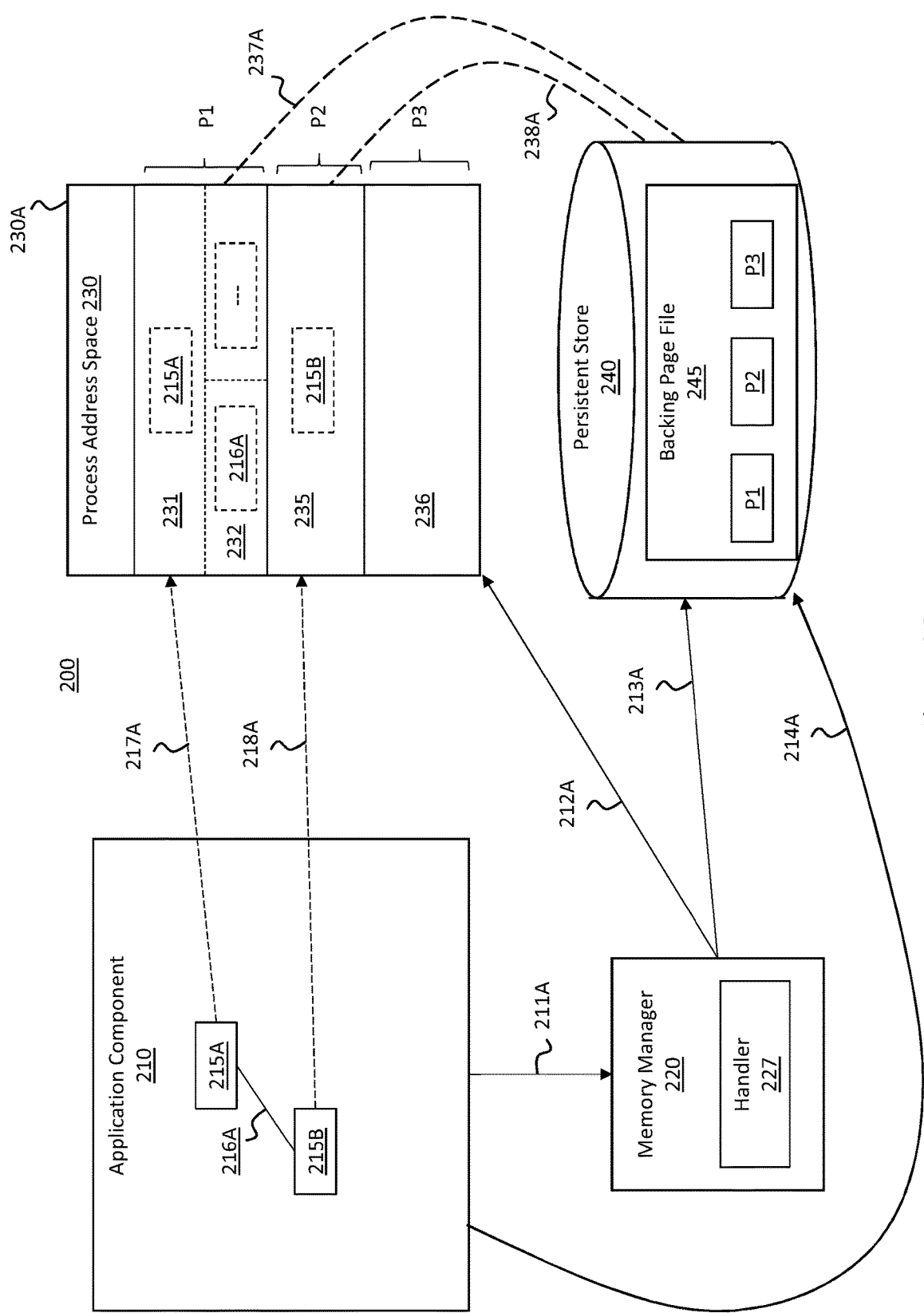

Attention is now given to FIGS. 2A-2C, which illustrate an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in 2A-2C, and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2A, the computing system 200 includes an application component 210 that may be implemented on the computing system 200. The application component 210 may be any reasonable application component and thus the embodiments disclosed herein are not limited by any particular type of the application component 210. In at least some embodiments, the application component 210 may include configuration data 215 that may be initially configured at runtime. For example, the configuration data 215 is shown in FIG. 2A in the form of a linked data tree structure having a first node 215A that is connected to a second node 215B by a first branch 216A. The first node 215A is also connected to a third node 215C a second branch 216B. The nodes 215B and 215C are shown as being connected to ellipses 216C and 216D respectively. The ellipses 216C and 216D represent that there may be any number of additional nodes and branches as needed in the configuration data 215. It will be noted that illustrating the configuration data 215 as a linked data tree structure is for ease of explanation only. Accordingly, the configuration data 215 may take any other reasonable form as circumstances warrant and the embodiments disclosed herein are not limited by the form or type of the configuration data 215.

As shown in FIG. 2A, the computing system 200 may include a memory manager 220. In at least some embodiments, the computing system 200 may implement virtual memory addressing. Accordingly, the memory manager 220 may represent one or more system memory managers such as a virtual memory manager and/or a heap memory manager. The memory manager 220 may also represent other operating system services and functions that are used in virtual memory mapping. In at least some embodiments, the application component 210 may be implemented in an embedded system that may not implement virtual memory addressing. In these embodiments, the memory manger 220 may represent the processor functions or other functions such as a direct memory access controller that are used in physical memory mapping. Accordingly, the embodiments disclosed herein are not limited to either virtual addressing or physical addressing as the embodiments disclosed contemplate the use of computing systems that implement virtual addressing schemes or that are embedded systems.

As shown in FIG. 2A, the computing system 200 may include system memory resources where configuration data 215 of the application component may be instantiated. For example, the computing system 200 may include a dedicated memory block 230A that is part of the system memory resources and in which the configuration data 215 may be instantiated. In the dedicated memory block 230A, a process address space 230 may be reserved by the computing system 200 for the instantiation of the configuration data 215. The reserved process address space 230 may include a preferred base address that may be used for allocation of a range of address (i.e., addresses 231-236) in the process address space 230 as will be explained in more detail to follow.

In at least some embodiments, during an initial configuration of the configuration data 215, the application component 210 may make an allocation request 211 to the memory manager 220 for one or more process addresses spaces in the dedicated memory block 230A. The allocation request 211 may be an allocation request that specifies a required size of the allocation. Alternatively, the allocation request 211 may be for a mapping to the base address of the process address space 230. The memory manager 220 may receive the allocation request 211 and may then allocate the range of address 231-236 in the process address space for the use of the application component 210. In other words, the memory manager 220 may allocate from the reserved process address space 230 addresses for the configuration data 215 since the process address space is reserved for the configuration data 215. For example, in at least some embodiments the memory manager may 220 may return a pointer to the starting address 231 of the range of address 231-236 in the process address space 230. In at some embodiments, the configuration data 215 may be mapped to the starting address 231 of the base address of the process address space 230. The memory manager 220 may include an allocator 225 that allocates the range of addresses 231-236. In those embodiments implementing virtual mapping, the memory manager 220 may also include an address or pointer table 226 that records a mapping between the virtual addresses seen by application component 210 and physical addresses in the dedicated memory block 230A.

In at least some embodiments, since the process address space 230 has been reserved for the configuration data 215, a memory manager, which may correspond to the memory manger 220, may also be instantiated in the process space 230 via the use of standard allocation and free routines. In such embodiments, the instantiated memory manager, may be configured to always allocate memory for the configuration data from the reserved process address space 230.

As mentioned, in at least some embodiments the memory manager 220 may allocate the process memory space 230 for the configuration data 215 as shown at 212. In at least some embodiments, the process address space 230 of the dedicated memory block 230A may be reserved for those portions of application configuration data 215 that are meant to be persisted for use in a later initialization of the configuration data, as will be explained in more detail to follow. Accordingly, the application component 210 may make requests for additional allocations of process address spaces other than the process address space 230 in other blocks of system memory (not illustrated) from the memory manager 220 as circumstances warrant, including allocations that are not intended to be persisted in this new manner.

In at least some embodiments, based on the request 211, the memory manager 220 may create as shown at 213 a backing page file 245 in a persistent store 240 that will back the process address space 230. It will be noted that the persistent store 240 may be any type of persistent storage such as a hard drive, system disk, or even persistent RAM and it may be located on the same machine as the process address space 230 or be distributed across a network. Accordingly, the embodiments disclosed herein are not limited by the type of the persistent store 240. It will also be noted that the backing page file 245 is may be separate and distinct from any existing paging file functionality, such as paging files that an operating system may use to enable virtual memory.

As mentioned previously, in the embodiments disclosed herein it may be desirable to persist the configuration data 215 in the persistent store 240 so that this data need not be reconfigured at runtime in a future initialization of the application component 210. Accordingly, an operation of persisting the configuration data 215 will now be explained. In operation, the memory manager 220 may allocate the process address space 230 for the various components of the configuration data 215. For example, an address 231 within the process address space 230 may be assigned to the first node 215A and the branches 216A and 216B. The application component 210 may then access the mapped address 231, such as by reading from the memory location or writing to the memory location the first node 215A and the branches 216A and 216B, as shown at 217.

In similar manner, the memory manager 220 may assign within the process address space 230 an address 232 to the allocation for node 215B, an address 233 to the allocation for the node 215C, an address 234 to the allocation for the node or branch 216C and an address 235 to the allocation for the node or branch 216D. The application component 210 may then access the mapped addresses 232 and 233, such as by reading from the memory locations 232 and 233 or writing to the memory locations 232 and 233 the second node 215B and the third node 215C respectively as shown at 218 and 219 for addresses 232 and 233. The additional nodes or branches 216C and 216D may be accessed by the application component 210 at the locations of the addresses 234 and 235 as needed.

It will appreciated that although the addresses within the process address space 230 are illustrated as being contiguous, this is for ease of illustration only. In many instances, the addresses may not be contiguous as there may be header information or the like inserted between the memory locations of the nodes. In addition, as illustrated by ellipses 236, the process address space 230 may include additional addresses for writing additional elements of the configuration data 215 as needed into the process address space.

As mentioned above, in some embodiments the process address space 230 may be backed by the backing page file 245 that is stored on the persistent store 240. In some embodiments, the backing page file 245 may be immutable, although this need not always be the case. Accordingly, in such embodiments the memory manager 220 may make a one-to-one mapping between the configuration data 215 loaded in the process address space 230 of the dedicated memory block 230A and the backing page file 245. In at least some embodiments, this may result in the configuration data 215 automatically being stored in the backing page file 245. For example, when a paging handler 227 of the memory manager 220 pages in or out the configuration data 215 from the process address space 230, the configuration data will be paged in and out of the backing page file 245. In this way, the memory state of the dedicated memory block 230A is implicitly saved to the backing page file 245 and can be used in future initializations as will be explained in more detail.

For ease of illustration, FIG. 2A shows the first node 215A and corresponding branches 216A and 216B as being part of a first memory page P1, the second node 215B and any corresponding branches 216C as being part of a second memory page P2, and the third node 215C and any corresponding branches as being part of a third memory page P3. Since there may be in at least some embodiments a one-to-one mapping between the process address space 230 and the backing page file 245 as previously described, the memory page P1 is shown at 237 as being stored in the backing page file 245, the memory page P2 is shown at 238 as being stored in the backing page file 245, and the memory page P3 is shown at 239 as being stored in the backing page file 245. Pointers to the process address space addresses 231, 232, and 233 may be stored in the backing page file 245 as part of this process. Thus, without any work by the application component 210, the configuration data 215 and the memory state of the dedicated memory block 230A as the configuration data is implemented may be persisted in the persistent store 240.

FIG. 2A thus illustrates a time period where the configuration data 215 and the memory state of the dedicated memory block 230A are persisted in the persistent store 240. Turning to FIG. 2B, a later time period is illustrated. In FIG. 2B, the computing system 200 has been shut down and the application component 210, the memory manager 220, and any other operating system functions have also been shut down. Thus, only the persistent store 240 and the backing paging file 245 that includes the configuration data 215 and the memory state of the dedicated memory block 230A are shown.

FIG. 2C will now be used to illustrate a time period after that of FIG. 2B. The time period of FIG. 2C may be when it is desired to initialize or otherwise restore the application component 210 and its configuration data without having to configure all of the data in the normal manner at runtime. Advantageously, the use of the persisted backing page file 245 allows this as will now be explained.

As shown at 214, the application component 210 or some other element of computing system 200 may access the persistent store 240 to ascertain that the backing page file 245 is present in the persistent store and may then open the backing page file. In at least some embodiments, the application component 210 may read a portion of the backing page file 245 in order to ascertain the preferred process address space 230 address range (e.g., preferred base address and byte length) for the dedicated memory block 230A. For example, this preferred address range may include the addresses 231-235 previously discussed. The application component 210 may also ensure that the preferred address range is available for use by the application component 210 in the dedicated memory block 230A as will now be explained.

The application component 210 may make a mapping request 211A, to request that at least a portion of the backing page file 245 be mapped to a starting address (i.e., the address 231 in some embodiments) in the process address space 230. In at least some embodiments, the mapping request 211A includes an indicium of a requested preferred base address in the process address space 230 at which to begin mapping the backing page file 245. In at least some embodiments, the mapping request 211A may include an indicium of a location in the backing page file 245 where a preferred base address may be found. In at least some embodiments, the preferred base address is stored in a predetermined location in the backing page file 245 (e.g., a standardized location). In at least some embodiments, the backing page file 245 includes an indicium of a starting location or offset within the backing page file 245 for the data to be mapped to the dedicated memory block 230A.

In response, the memory manager 220 may create a new mapping for the dedicated memory block 230A at the process address space 230, including the addresses 231-235. For example, when the restored configuration data 215 will be restored at the same process address space 230 in the dedicated memory block 230A that was initially used for the configuration data 215, the base address and the offset relationship between the process address space 230 addresses 231-235 is maintained and the configuration data 215 is able to be restored to the same memory location without any modification to the data values stored in the backing file 245. The base address of the system memory and the offset relationship between addresses will be discussed in more detail to follow in relationship to FIG. 3B. In some embodiments, the mapping of the backing page file 245 to the process address space 230 may be implemented as a private copy-on write mapping. In such embodiments, the application component 210 is able to both read and write the configuration data 215 by reading and writing the memory at the addresses of the process address space 230, without persisting the changes in the backing page file 245. Further, the mapping of the configuration data 215 to the process address space 230 is not visible to any other process that may also map to the backing page file 245. In addition, any updates are not carried through to the backing page file 245.

In some embodiments, the backing page file 245 may be exposed in a container including the backing page file 245 such that any writes only exist in the container, which is then thrown away with the container. In addition, the container may be able to copy the backing page file 245 to another location after it has been changed, such as a location outside the container if circumstances warrant. When the configuration data stored in the backing page file 245 is restored to the same addresses 231-235 in the process address space 230 originally used during the creation of the backing page file (e.g., restored to the preferred base address), the configuration data 215 may be restored to the dedicated memory block 230A without the need to reconstruct the data structures. For example, when using a memory mapped file, when the application component 210 attempts to access a memory address within the memory page P1 for the node 215A, a page fault will be generated if the memory page P1 is not currently loaded in the process address space 230. In response, the paging handler 227 may access as shown at 213A the backing page file 245 and page in the memory page P1 as shown at 237A.

Likewise, when the application component 210 attempts to access a memory address within the memory page P2 for the node 215B, a page fault will be generated if the memory page P2 is not currently loaded into the process address space 230. In response, the paging handler 227 may access, as shown at 238A, the backing page file 245 and page in the memory page P2, which may result in the branch 216A and node 215B being paged into the process address space 230 of the dedicated memory block 230A. It will be appreciated that the process of paging in the memory pages P1 and P2 may happen in almost constant time of a few milliseconds.

It will be noted that in the embodiment shown in FIG. 2C, the third node 215C and the second branch 216B are not accessed by the application component 210. Accordingly, because no access to the memory page P3 was made, memory page P3 is not paged into the process address space 230. Rather, the memory page P3 remains persisted in the backing page file 245 and may be paged in later during the runtime of the application component 210 as needed.

Shown below is an example of pseudo-code that may be used to restore the configuration data 215 to the same process address space preferred base address:

```
void * preferredBaseAddress = ... // previously gotten
int configurationFileFileDescriptor = ... // handle to the file
size_t configurationFileByteLength = ... // length of data to map
off_t configurationFileStartingOffset = ... // start of data to map
int protectionType = PROT_READ;
int flags = MAP_PRIVATE;
```

```
if (isForContainer) {
    // set to discard modifications made to memory via copy-on-write
    flags = MAP_PRIVATE; // copy-on-write
    protectionType = PROT_READ;
    if (!isReadOnlyContainerConfiguration) {
        protectionType |= PROT_WRITE; // mapped memory
        can be written
    }
} else if (updatingConfigurationFile) {
    // allow read and write access to the mapped memory
    // and propagate changes to backing page file
    protectionType = PROT_READ | PROT_WRITE;
    flags = MAP_SHARED_VALIDATE;
} else {
    // allow mapped memory sharing, without allowing current
    // mapping to cause updates to the data
    protectionType = PROT_READ;
    flags = MAP_SHARED_VALIDATE;
}
// require the preferred base address
Flags |= MAP_FIXED_NOREPLACE;
void * resultingAddress =
    mmap(
        preferredBaseAddress,
        configurationFileByteLength,
        protectionType,
        flags,
        configurationFileFileDescriptor
    );
if (resultingAddress != preferredBaseAddress) {
    // failed - can try advanced swizzle-enabled method
}
```

Thus, at least some of the embodiments disclosed herein provide that only the configuration data that is needed is paged into the process address space 230. If configuration data such as node 215C is never used, it might never be paged into the process address space. In addition, if configuration data such as node 215A is constantly used, then it may always remain in the process address space. Accordingly, for such embodiments, since configuration data that is never accessed need not be paged into the process address space, there is little correlation between the size of the backing page file 245 to restore and the amount of time that it takes to do the restoration. That is, regardless of how convoluted or complex the backing page file 245 is, by only paging in the needed configuration data, the operation is essentially a constant or near-constant time operation with a fixed cost of only a few milliseconds. This is advantageously an improvement on configuring the configuration data 215 from scratch which can take typically take several seconds. It is additionally an improvement on traditional deserialization where the time to restore the configuration data is in between configuring from scratch and the time of the embodiments disclosed herein.

In at least some of the embodiments previously described, the configuration data 215 was restored by mapping the backing page file 245 to the same addresses (i.e., addresses 231, 232, and 233) within the process address space 230 that were used when the application component 210 was first configured. However, in many instances it may not be possible to map the backing page file 245 to the same addresses within the process address space 230 when restoring the configuration data 215. For example, at least one of the addresses 231, 232, and 233 within the process address space 230 may not be available to be used by the dedicated memory block 230A as they may be allocated to another purpose. Alternatively, a user may use a different computing system when restoring the configuration data, which may prevent use of at least one of the preferred process address space base addresses for a block of system memory of the different computing system.

Figure 3A:
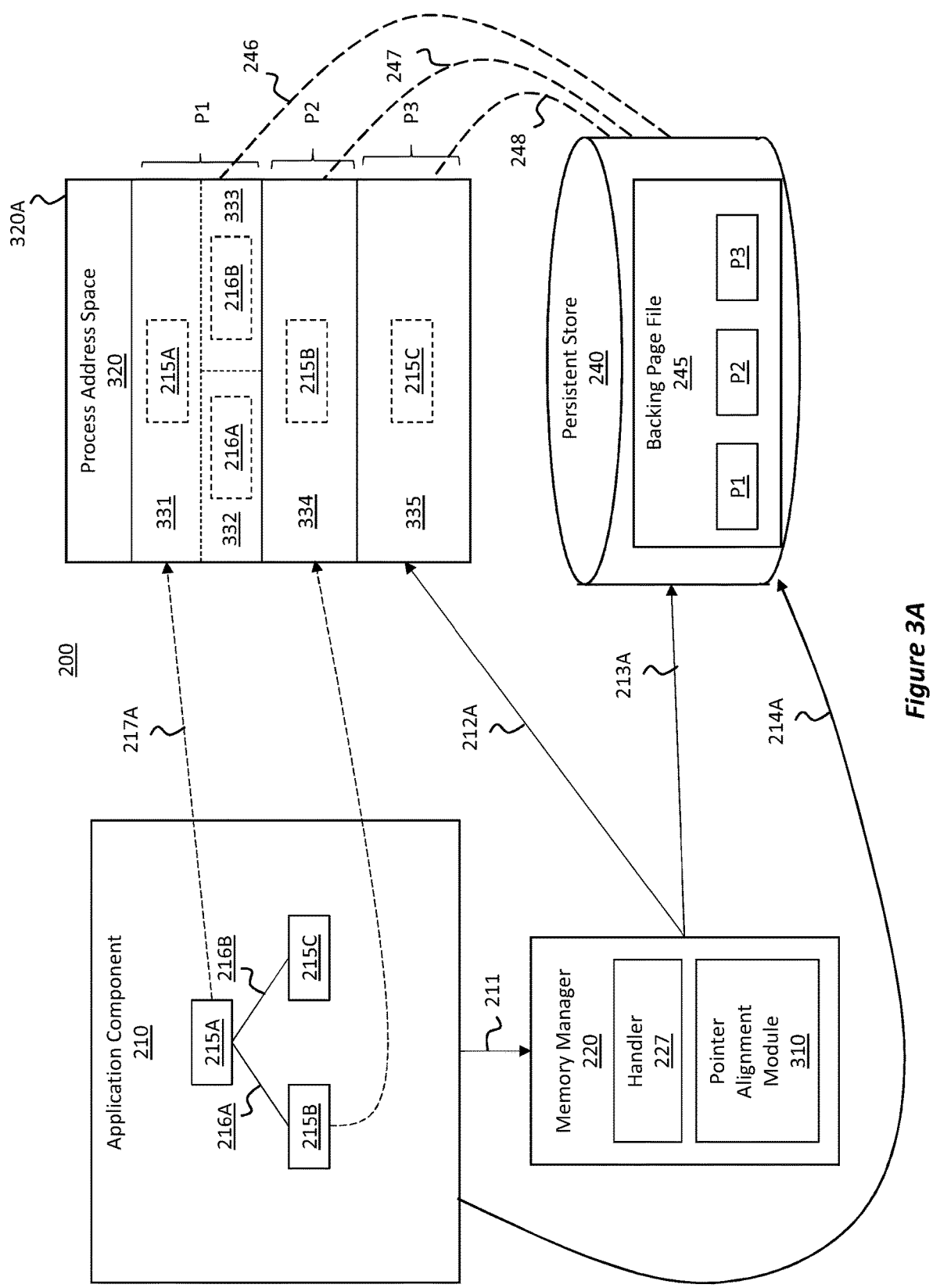
FIGS. 3A and 3B illustrate an alternative embodiment of the computing system that may implement the embodiments disclosed herein.

Accordingly, as illustrated in FIG. 3A, in at least some embodiments the memory manager 220 may include a pointer alignment module 310. Although the pointer alignment module 310 is shown as being part of the memory manager 220, in at least some embodiments the pointer alignment module 310 may be part of a different element of the computing system 200, such as provided by the application component 210 or provided by a hardware component. In operation, the pointer alignment module 310 may be able to perform an operation, sometimes referred to as pointer "swizzling", that is able to align a pointer restored from the backing page file. As one example, the pointer alignment module 310 may align a process address space address saved in backing page file 245 to align with a different process address space address. For example, if the backing page file 245 is associated with a preferred process address space base address of 0xA000000 (using 32-bit pointers) and stores a pointer with a process address space address value of 0xA0000DD0, but the mapping is instead restored to a process address space base address of 0xB0000000, the pointer alignment module 310 may align the pointer to have a process space address value 0xB0000DD0.

Similarly, if the backing page file 245 is associated with a preferred physical memory base address of 0x00080000, and contains a pointer with a physical memory address value of 0x00080CC0, but the mapping is instead restored to a physical memory base address of 0x00FF0000, the pointer alignment module 310 may align the pointer to have the physical memory address value 0x00FF0CC0. Thus, the pointer alignment module 310 may align a pointer to an address where the configuration data 215 will be restored, based on the pointers saved in backing page file 245 that point to the preferred physical memory addresses (not shown) and/or the address space addresses 231, 232, and 233. Accordingly, although FIGS. 2A-3B illustrate a process address space (i.e., process address space 230 and 320), these may also be considered physical address spaces in those embodiments that implement physical address pointers based on the physical memory address to which the data is to be restored. For example, in embodiments where configuration data 215 includes physical memory addresses, such as used by devices for DMA operations and the like. Accordingly, the description made herein in relation to pointer "swizzling" for process address spaces also applies if the address spaces 230 and 320 are physical address spaces. Thus, the embodiments and the claims disclosed herein cover both process address spaces and physical memory address spaces.

Figure 3B:
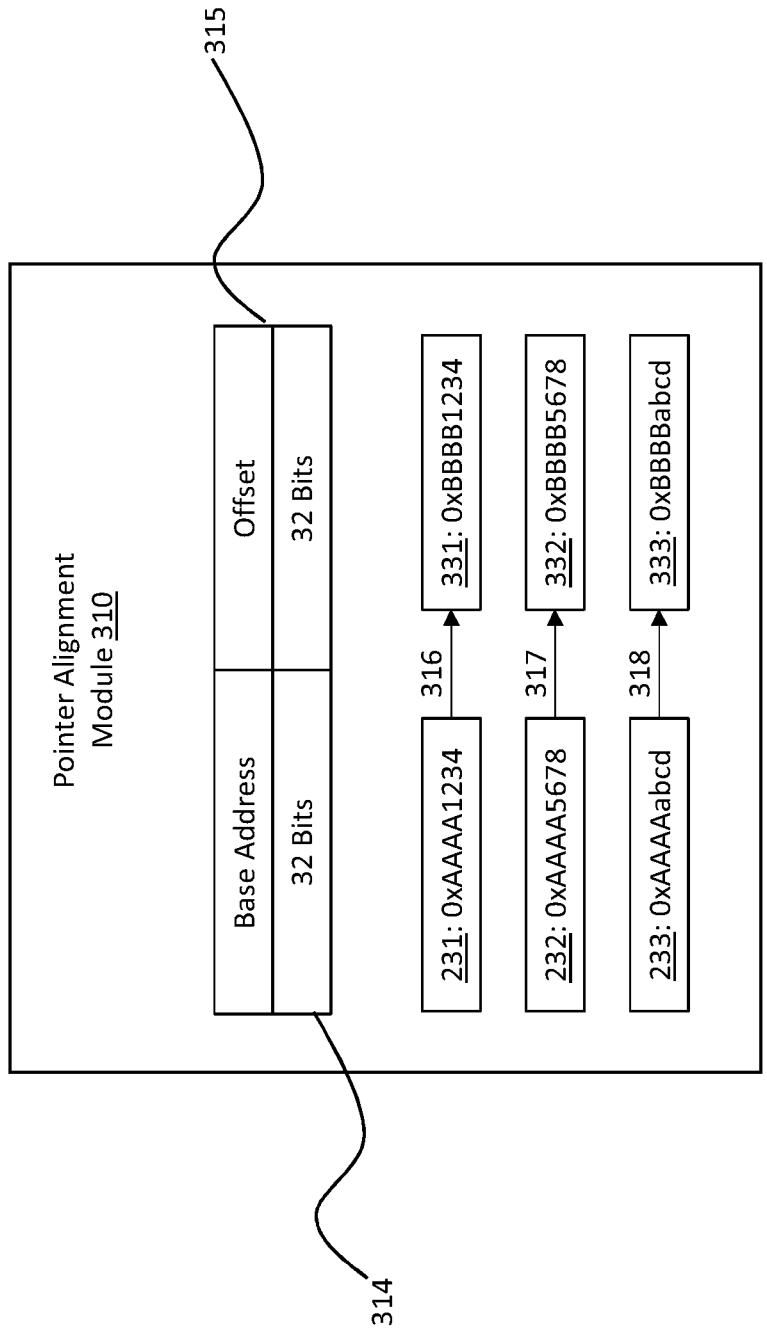

FIG. 3B illustrates an example embodiment of the pointer alignment module 310 and its operation as will now be explained. In the embodiment the pointers to the addresses may be aligned on a 4 GB boundary. In other words, the offset portion of the pointers, because it is 32-bits, may include an offset that is between zero and $2^{32}-1$ bytes, and thus the base addresses will be aligned on a $2^{32}$ byte (4 GB) boundary. Of course, alignment on a 4 GB boundary is only one example. In other embodiments, other widths for the base address and the offset may also be used. In addition, the size of a pointer may also be different ((e.g., 32-bit pointers with 12-bit base and 20-bit offset, or 128-bit pointers with 67-bit base and 61-bit offset, or 40-bit pointers with 11-bit base and 29-bit offset, etc.). In some embodiments, the lower bound for the number of bits used for the offset may be the number of significant bits in the size of a single mapped section of the backing file (i.e., how many bit are needed to uniquely address an offset within the mapped section?). Accordingly, the embodiments disclosed herein are not limited by how the base and offsets are implemented as any reasonable implementation of the base and the offsets can be used.

As an example, the pointers used by the alignment module 310 may be implemented as 64 bits, with 32 bits being high bits or most significant bits and 32 bits being low bits or least significant bits. The high 32 bits may be considered a base address of the process address space where the configuration data will be loaded and the low 32 bits may be considered an offset relationship between the individual addresses of the base address. Thus, the base address of the process address space 230 may be different from the base address of another block of process address space. In addition, the offset is related to how the process addresses 231, 232, and 232 are located in relation to each other in the process address space 230.

Accordingly, in some embodiments, the application component 210 may make the request 211A previously described for a block of process address space, and which may be allocated a memory block 320A within the process address space 320 having a base address. The pointer alignment module 310 may then perform the pointer "swizzling" operation by aligning the base address of the process address space 320 with the offset relationships between the addresses 231, 232, and 232 within the process address space 230 as defined by the offset information previously stored in the backing page file 245. This operation will lead to addresses 331, 332, and 333 within the process address space 320 that maintain the same location displacement relationship as the addresses 231, 232, and 233. Accordingly, the pointers to addresses 331, 332, and 333, although being different pointers than those to addresses 231, 232, and 233, will function as equivalent pointers that will result in the configuration data 215 stored in the backing page file 245 being restored to the memory block 320A at the process address space 320.

For example as shown in FIG. 3B, suppose address 231 has a pointer or address value of 0xAAAA1234, address 232 has a pointer value of 0xAAAA5678, address 233 has a pointer value of 0xAAAAabcd and the base address 314 for the process address space 230 is 0xAAAA0000. It will be noted that the base address portion 314 (i.e., 0xAAAA) is different from the offset portions 315 (i.e., 1234, 5678, or abcd) of the pointer values for addresses 231, 232 and 233. Further suppose that the base address 314 of the process memory space 320 is 0xBBBB0000. Performing the pointer swizzling operations 316, 317, 318 on the previous pointer value would generate a pointer value 0xBBBB1234 for the address 331, a pointer value 0xBBBB5678 for the address 332, and a pointer value 0xBBBBabcd for the address 333 within the process space 320. The swizzling can be efficiently performed with bitwise operations, because the bits used for the offset and base address do not overlap. In this example, the offset may be the least-significant 15 bits and the base address may be the most-significant 17 bits. Thus, the swizzle operation could be calculated as:

```
if (nullptr == sourceAddress) return nullptr;
return (sourceAddress & 0x7FFF) | 0xBBBB0000;
```

Or equivalently:

```
if (nullptr == sourceAddress) return nullptr;
offsetMask = (1 << offsetBits) - 1; // result here is 0x7FFF
baseAddress = 0xBBBB0000;
offset = sourceAddress & offsetMask;
return = baseAddress | offset;
```

As illustrated, these pointer values preserves the offset value from the prior pointer values and combines that with the base address of the new process address space. These new pointer values could be used to restore the configuration data 215 at the addresses 331 and 332 within the process address space 320.

It will be noted that other types of pointer "swizzling" operations may also be implemented as circumstances warrant. In at least some embodiments, the backing page file 245 may include, for any mappable section of the backing page file, an indication of one or more areas that require pointer swizzling (e.g., physical memory pointer swizzling, process address space pointer swizzling). This indication may be done in various manners, such as a bitmap, list, or combinations of techniques. In at least some embodiments, the backing page file 245 may include, for any mappable section of the backing page file or associated with an indication of one or more areas that require pointer swizzling, an explicit indication of or other indicium of one or more of: a maximum pointer size for a stored physical memory pointer, a maximum pointer size for a stored process address space pointer, a number of bits used for a preferred physical memory base address, a number of bits used for a preferred process address space base address, a minimum number of bits to be used for a physical memory pointer offset, a minimum number of bits to be used for a process address space pointer offset, a swizzle indicator bit width, an indication of which area(s) of a mapped section require process address space pointer swizzling when a preferred process address space base address is not used during load, or an indication of which area(s) of a mapped section require physical memory pointer swizzling when a preferred physical address is not used during load.

Thus, the embodiments disclosed herein are not limited to having a single base address stored in the backing page file 245. That is, in at least some embodiments, such as that described above in relation to FIGS. 3A and 3B, a single base address for the process address space 320 may be utilized. However, the backing page file 245 may also include multiple base addresses for different sections of the backing page file. When performing a swizzing operation, the computing system may simply iterate through each of the different sections using the different base addresses and corresponding offsets. Thus, if using a memory mapped file, a request to memory-map a file to a single, preferred base address may be made. Alternatively, a request to memory-map a file to a set of preferred base addresses and corresponding offsets may also be made.

As shown in FIG. 3A, using a memory mapped file, when the application component 210 attempts to access the node 215A, branch 216A, branch 216B, node 215B, or 215C, a page fault will be generated if the memory pages P1, P2, and P3 are not actually available in the process address space 320. In response, the paging handler 227 may page in the memory pages P1, P2, and P3 as shown at 237A, 238A and 239A in the manner previously described.

In at least some embodiments, the paging handler 227 may cause the execution of the pointer alignment module 310 as pages are paged into the process address space. In at least some embodiments, as an optimization the paging handler or pointer alignment module may track if a page already had the swizzling operation applied, to avoid swizzling values that were already swizzled for the new base address. In at least some embodiments, a swizzling operation is applied even when a corresponding preferred base address was used (e.g., when the backing page file may contain pointers with an invalid base address). As previously described, the paging handler 227 need not page in all the memory pages P1, P2, and P3, but only those that are needed by the application component 210. In at least some embodiments, the paging handler may include a callback into a routine provided by the application component 210, such as one provided during the request to correlate the dedicated memory area with the file, and this routine may cause performance of some or all of the pointer swizzling tasks.

Figure 4:
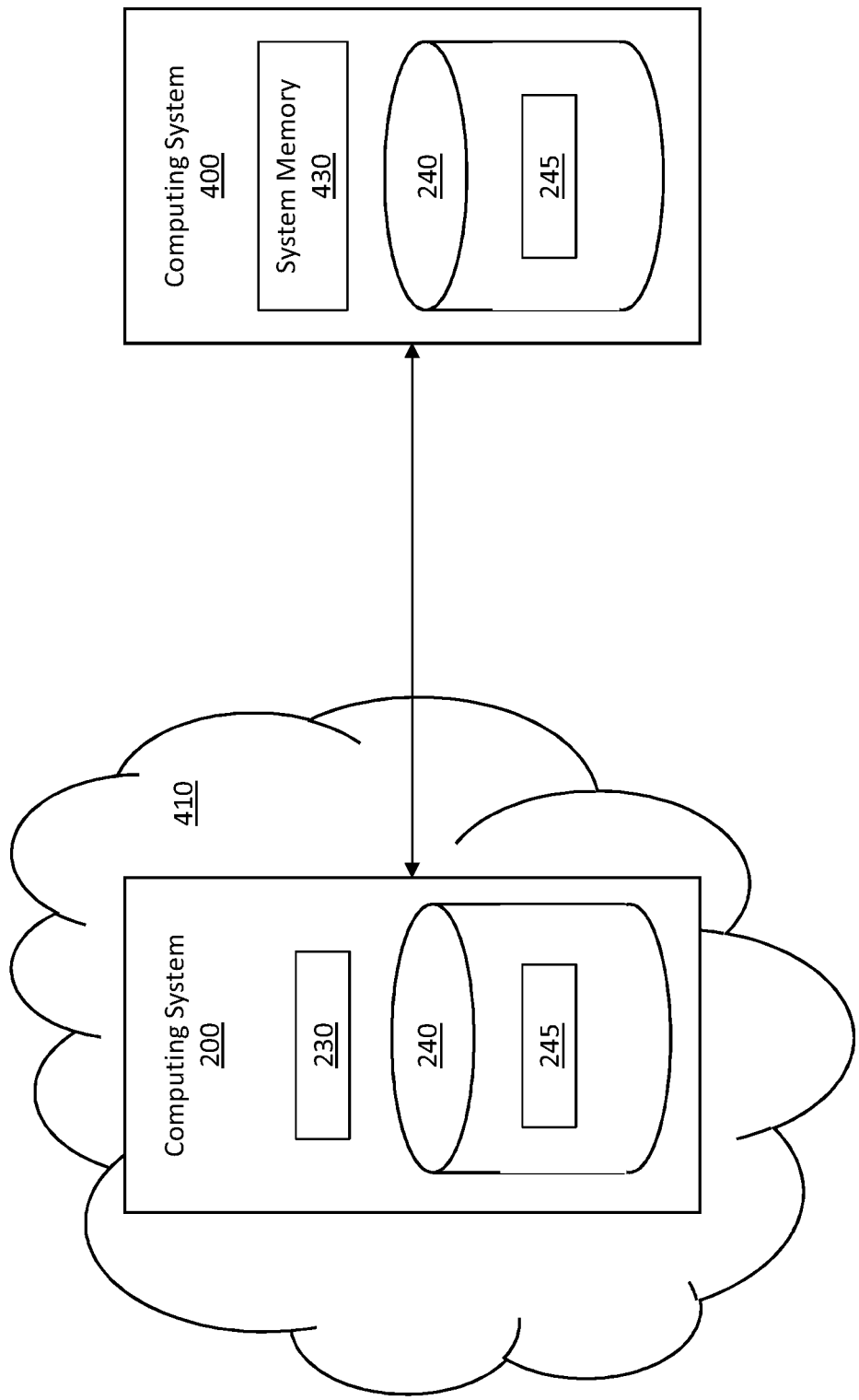
FIG. 4 illustrates an embodiment of the computing system where a persistent storage is relocated from one computing system to another computing system.

FIG. 4 illustrates an embodiment of the computing system 200, including the process address space 230, the persistent store 240, and the backing page file 245. In the embodiment of FIG. 4, the configuration data 215 has been stored in the backing page file 245 in the manner previously described. In at least some embodiments, the process of storing the configuration data 215 in the backing page file 245 may be done in a configuration lab or it may be done during manufacturing of the computing system 200. As illustrated by the cloud 410, at the time of storing the backing page file 245, the persistent store 240 may be a disk that is physically located on the computing system 200 or it may be a persistent store that is accessible by the computing system 200 via the cloud 410.

As shown in FIG. 4, a second computing system 400 that is similar to the computing system 200 may also be present. In the embodiment, the second computing system 400 includes a memory block at a process memory space 430 that is different from the process memory space 230 since it is located in a different computing system.

As shown in FIG. 4, the persistent store 240 and the backing page file 245 that has the stored configuration data 215 may be relocated to the second computing system 400. In the embodiment, being relocated may mean that the backing page file 245 that has the stored configuration data 215 is made available to the second computing system 400. This can include, for example, physically installing the backing page file 245 in the second computing system 400, or the second computing system 400 being given access permissions to the backing page file 245.

In either case, once the persistent store 240 and the backing page file 245 that has the stored configuration data 215 has been relocated to the second computing system 400, the second computing system 400 may restore the configuration data 215 from the backing page file 245 in the manner previously described in relation to FIGS. 3A and 3B even if the base address of the process address space 430 is different than that of the process address space 230. Advantageously, being able to relocate the persistent store 240 and the backing page file 245 that has the stored configuration data 215 allows the configuration data 215 and the corresponding memory state to be stored at one location and then relocated to another location. At the new location, the stored configuration data 215 and corresponding memory state may be restored much more quickly than if the configuration data needed to be configured in the traditional manner.

Although embodiments disclosed herein have described the configuration data 215 stored in the backing page file 215 as all being restored to either the addresses 231-233 within the process address space 230 or to the addresses 331-333 within the process address space 320 that are derived from the addresses 231-233, this need not always be the case. For example, in at least some embodiments, a pointer to an address (either physical memory pointer or process address space pointer) of an element of the configuration data 215 may be set to set to NULL or to some predetermined invalid virtual or physical address. In at least some embodiments, the pointer alignment module 310 may be configured to not modify a pointer that is set to NULL or to the predetermined invalid virtual or physical address. In at least some embodiments, the pointer alignment module 310 may modify a pointer that is set to NULL or to the predetermined invalid virtual or physical address so that they conform to an address that is derived from the addresses 231-233 within the process address space 230. In some embodiments, when loading from the backing page file 245, the first page of memory may be mapped as no-access (trap on any access). One reason for doing this is so that swizzling of a NULL pointer need not be special-cased. An alternative is a post-swizzle pass that, when detecting that the swizzled pointer value==base address, overwrites that value with NULL.

In addition, in at least some embodiments there may be a pointer that points to a location outside of the address range 331-333 within the process address space 320 that is derived from the addresses 231-233 within the process address space 230. In such embodiments, the pointer alignment module 310 may be configured with special handling instructions that ensure that the configuration data that is associated with the locations outside of the address range 331-333 within the process address space 320 is properly accessed in the correct block of system memory. For example, suppose a mappable file section ALPHA with preferred base address X and a mappable file section BETA with preferred base address Y. In such a case, BETA may indicate an external mapping relationship with ALPHA, while ALPHA may indicate no external mapping relationships, and store within BETA pointer values usable when both ALPHA and BETA are restored to their corresponding preferred base addresses. For pages in ALPHA, swizzling would not be necessary when ALPHA is loaded to its preferred base address. For pages in BETA, swizzling could only be avoided when both ALPHA and BETA are loaded to their preferred base address. Otherwise, as least some swizzling would be necessary for BETA, because at least one pointer value would need to be updated for the non-preferred base address. In either case, the swizzling operation would still be statically determinable after the mapping operation(s) are done, and thus suitable for programming into hardware-assisted swizzling. The swizzling for BETA supports multiple base addresses, and modifies the base address based on the original value of the stored base address. Then, the pointer alignment module would adjust references to file B's preferred base address differently than references to file A's preferred base address. Accordingly, the embodiments disclosed herein allow for portions of the configuration data 215 to be restored to different addresses ranges in system memory.

For example, suppose ALPHA has a preferred process address space base address of 0xAA000000, and has 0x73A0 bytes to be mapped (implying a minimum 15 bits for offset), but was actually mapped at 0xDD000000. Suppose that BETA has a preferred process address space base address of 0xBB000000, and indication that the pointer values may include pointers to data from ALPHA, and has 0x20 bytes to be mapped (implying a minimum 6 bits for offset), and was mapped to its preferred processes address space. The 32 bytes mapped from BETA correspond to eight 32-bit process address space pointers. Because ALPHA was not mapped to the preferred base address, and BETA may reference ALPHA's data, BETA will have swizzling applied. The number of bits used for the offset will be at least the larger of the two offsets for ALPHA and BETA (thus, at least seven bits). Some implementations may elect to opportunistically align the offset to byte boundaries (multiples of eight) or other multiples. Using this example, the swizzling function for BETA may be generated to be similar to the following:

```
uint_ptr swizzle(uint_ptr sourceAddress) {
    if (sourceAddress == null) return null;
    static const uint bitsForOffset = 7;
    static const uint_ptr offsetMask = (1 << bitsForOffset) - 1;
    static const uint_ptr addressSpaceMask = ~offsetMask;
    uint_ptr sourceBaseAddress = sourceAddress & addressSpaceMask;
    uint_ptr sourceOffset = sourceAddress & offsetMask;
    if (sourceBaseAddress == 0xAA000000) {
        return (0xDD000000 | sourceOffset);
    }
    return sourceAddress
}
```

In some embodiments, multiple swizzling operations may be needed that deal with more than one address space. For example, a first swizzling operation may swizzle distinct sets of pointers in a first portion of the backing page file 245 using virtual memory addresses according to a current process address space. A second swizzling operation may use physical memory address (e.g., for sue with DMA devices). An additional sizzling operation may use the multi-portion scenario described in the previous paragraph.

Although the embodiments disclosed herein have described the dedicated memory block 230A or the memory block 320A as being exclusively used to restore the configuration data that is stored in the backing page file 245, this need not always be the case. For example, in at least some embodiments memory block 230A or the memory block 320A may include additional data structures that are already present before the configuration data 215 is restored. In such embodiments, the memory manager 220 may ensure that the data configuration data 215 is properly loaded into the system memory without impacting the existing data structures.

In at least some embodiments, portions or all of the backing page file 245 may be cryptographically signed or hashed (or combinations thereof). In at least some embodiments, a cryptographic signature or hash for a portion or all of the backing page file 245 may be based on the contents as stored in the backing page file. In at least some embodiments, a cryptographic signature or hash may be based on contents where with all pointer base values set to a predetermined pattern of bits (e.g., all-zero bits, all-one bits, 0x304892, etc.). In at least some embodiments, the predetermined pattern may be stored elsewhere in the file. In at least some embodiments, the base portion of the pointer are replaced with zero bits prior to being provided to the signing/hashing algorithm. In at least some embodiments, both a first cryptographic signature or hash of the as-stored contents, and a second cryptographic signature or hash of the contents with base portions of pointers set to all zero are both stored. In such a case, validation of the memory contents when swizzling is not applied may rely on the first cryptographic signature or hash, while the second cryptographic signature or hash may be used if swizzling is applied. Using a predetermined pattern allows validation of the contents of the signed/hashed section, even if at least one preferred base address was not used (e.g., not available) when restoring the data from the backing page file.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
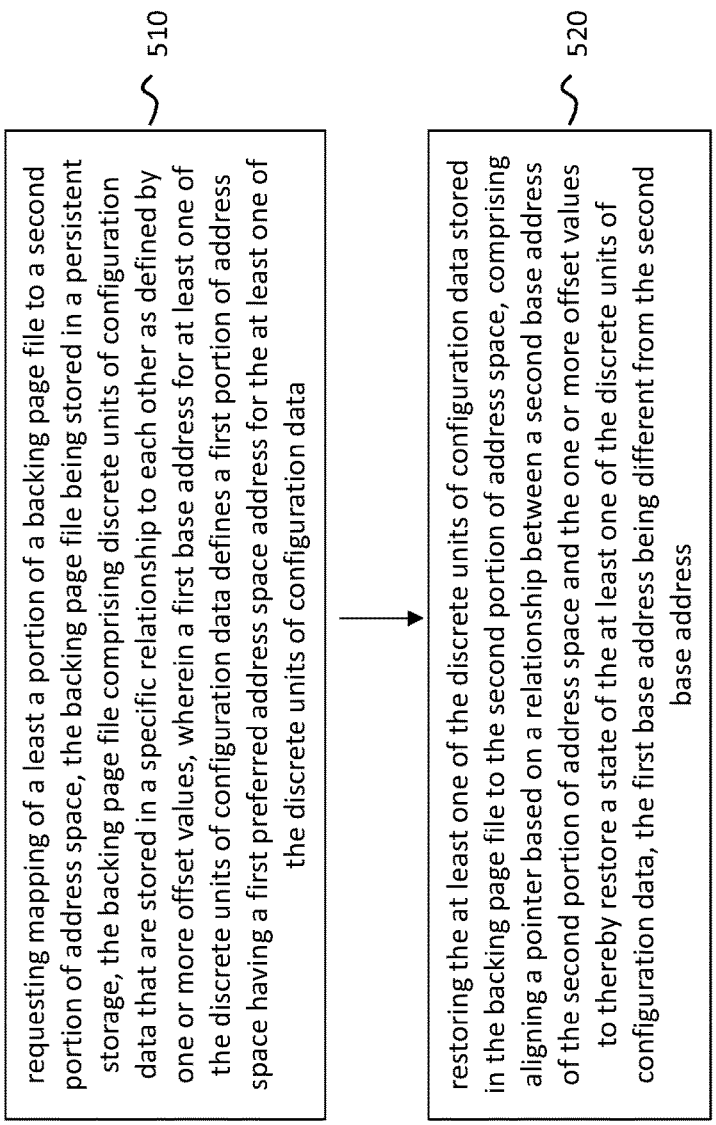
FIG. 5 illustrates a flow chart of an example method for restoring a state of stored configuration data of an application component that is be executed on the computing system.

FIG. 5 illustrates a flow chart of an example computerized method 500 for restoring a state of stored configuration data of an application component that is be executed on a computing system. The method 500 will be described with respect to one or more of FIGS. 2A-4 discussed previously.

The method 500 includes requesting mapping of a least a portion of a backing page file to a second portion of address space (510). The backing page file includes discrete units of configuration data that are stored in a specific relationship to each other as defined by one or more offset values. The backing page file is stored in a persistent memory. A first base address for one of the discrete units of configuration data defines a location in a first process address space having a preferred address space address.

For example, as previously described, the backing page file 245 may be stored in the persistent storage 240. The backing page file includes the discrete units of configuration data 215 such as nodes 215A-215C and branches 216A-216D that are stored in in a specific relationship to each other as defined by one or more offset values of the addresses 231-233. In at least some embodiments the backing page file 245 backs the process address space 230 and so the configuration data 215 may also be automatically stored in the backing page file.

The backing page file 245 may be mapped to the second portion of address space such as address space 230 (in embodiments where the first and second addresses spaces are the same) or 320 (in embodiments where the first and second address spaces are different). A base address may define a location of the discrete units of configuration data 215 in the first address space 230 at the preferred address space base address, such as address 231. As discussed previously, the address spaces 230 and 320 may represent process address spaces or physical memory address spaces.

The method 500 includes restoring at least one of the discrete units of configuration data stored in the backing page file in the second portion of address space, comprising aligning a pointer based on a relationship between a second base address of the second portion of address space and the one or more offset values to thereby restore a state of the at least one of the discrete units of configuration data (520). The first and second base address are different from each other. For example, as previously described one or more of the configuration data 215 may be restored into the address space 230 (in embodiments where the configuration data is restored to the dedicated memory block 230A) or in the address space 320 (in embodiments where the configuration data is restored to the memory block 320A). The restoring may be done by aligning a pointer based on a base address of the second portion of process address space and the one or more offset values such as the offset values 315 of the addresses 231-233 and on the base address 314 the process address space 230 or 320. This may restore the state of the configuration data in the many advantageous ways previously discussed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for restoring a state of stored configuration data of an application component that is be executed on the computing system, the computing system comprising:
at least one processor;
a computer readable hardware storage device having stored thereon computer-executable instructions which, when executed by the at least one processor, cause the computing system to perform the following:
request mapping of a least a portion of a backing page file to a second portion of address space, the backing page file being stored in a persistent storage, the backing page file comprising discrete units of configuration data that are stored in a specific relationship to each other as defined by one or more offset values, wherein a first base address for at least one of the discrete units of configuration data defines a first portion of address space having a preferred address space address for the at least one of the discrete units of configuration data; and
restore the at least one of the discrete units of configuration data stored in the backing page file to the second portion of address space, comprising aligning a pointer based on a relationship between a second base address of the second portion of address space and the one or more offset values to thereby restore a state of the at least one of the discrete units of configuration data, the first base address being different from the second base address.

2. The computing system of claim 1, wherein restoring the at least one of the discrete units of configuration data comprises:
generating a page fault when the at least one discrete unit of configuration data is not available at the second portion of process address space; and
in response to the page fault, paging in the at least one discrete unit of configuration data from the backing page file to the second portion of process address space.

3. The computing system of claim 1, wherein the first and second portions of address space are the same such that the least one of the discrete units of configuration data is restored in system memory at the preferred address space address.

4. The computing system of claim 1, wherein the backing page file backs a portion of system memory mapped at the first address space.

5. The computing system of claim 1, wherein the persistent storage is located on the computing system.

6. The computing system of claim 1, wherein restoring the at least one of the discrete units of configuration data comprises:
restoring the at least one of the discrete units of configuration data as one or more of read-only data, read-write data, and copy-on write data.

7. The computing system of claim 1, wherein the preferred address space address is a virtual address.

8. The computing system of claim 1, wherein the preferred address space address is a physical address.

9. The computing system of claim 1, wherein the first and second base addresses are selected from the group consisting of a process address space base address and a physical memory address space base address.

10. A computerized method for restoring a state of stored configuration data of an application component that is be executed on the computing system, the computing system comprising:
  requesting mapping of a least a portion of a backing page file to a second portion of address space, the backing page file being stored in a persistent storage, the backing page file comprising discrete units of configuration data that are stored in a specific relationship to each other as defined by one or more offset values, wherein a first base address for at least one of the discrete units of configuration data defines a first portion of address space having a first preferred address space address for the at least one of the discrete units of configuration data; and
  restoring the at least one of the discrete units of configuration data stored in the backing page file to the second portion of address space, comprising aligning a pointer based on a relationship between a second base address of the second portion of address space and the one or more offset values to thereby restore a state of the at least one of the discrete units of configuration data, the first base address being different from the second base address.

11. The method of claim 10, wherein the first and second portions of address space are the same such that the least one of the discrete units of configuration data is restored in system memory at the preferred address space address.

12. The method of claim 10, wherein the backing page file backs a portion of system memory mapped at the first address space.

13. The method of claim 10, wherein the persistent storage is located on the computing system.

14. The method of claim 10, wherein restoring the at least one of the discrete units of configuration data comprises:
  restoring the at least one of the discrete units of configuration data as one or more of read-only data, read-write data, and copy-on write data.

15. The method of claim 10, wherein the preferred address space address is a virtual address.

16. The method of claim 10, wherein the preferred address space address is a physical address.

17. The method of claim 10, wherein the first and second base addresses are selected from a group consisting of a process address space base address and a physical memory address space base address.

18. A computer program product comprising one or more computer-readable storage media having thereon computer-executable instructions that are structured such that, when executed by one or more processors of a computing system, cause the computing system to restore a state of stored configuration data of an application component that is be executed on the computing system by causing the computing system to:
  request mapping of a least a portion of a backing page file to a second portion of address space, the backing page file being stored in a persistent storage, the backing page file comprising discrete units of configuration data that are stored in a specific relationship to each other as defined by one or more offset values, wherein a first base address for at least one of the discrete units of configuration data defines a first portion of address space having a first preferred address space address for the at least one of the discrete units of configuration data; and
  restore the at least one of the discrete units of configuration data stored in the backing page file to the second portion of address space, comprising aligning a pointer based on a relationship between a second base address of the second portion of address space and the one or more offset values to thereby restore a state of the at least one of the discrete units of configuration data, the first base address being different from the second base address.

19. The computer program product of claim 18, wherein the first and second base addresses are selected from a group consisting of a process address space base address and a physical memory address space base address.

20. The computer program product of claim 18, wherein the preferred address space address is one of a virtual address or a physical address.

* * * * *